United States Patent [19]

Tsuda et al.

[11] Patent Number: 4,492,977
[45] Date of Patent: Jan. 8, 1985

[54] PHOTOMULTIPLIER TUBE DEVICE

[75] Inventors: Masaya Tsuda; Ken-Ichi Yonemaru, both of Kyoto; Yoshikazu Masuda, Ibaraki, all of Japan

[73] Assignee: Dainippon Screen Manufacturing Co., Ltd., Kyoto, Japan

[21] Appl. No.: 399,525

[22] Filed: Jul. 19, 1982

[30] Foreign Application Priority Data

Jul. 23, 1981 [JP] Japan .................. 56-110170[U]

[51] Int. Cl.³ .............................................. H04N 1/46
[52] U.S. Cl. ........................................ 358/75; 358/229
[58] Field of Search .................. 358/75, 294, 41, 76, 358/209, 229; 250/207, 208, 226, 227, 219, 578

[56] References Cited

U.S. PATENT DOCUMENTS

| | | | |
|---|---|---|---|
| 3,351,762 | 11/1967 | Adkins | 250/226 |
| 3,543,099 | 11/1970 | Turner | 250/226 |
| 3,561,846 | 2/1971 | Kingsland | 358/294 |
| 3,588,514 | 6/1971 | Simpkins | 358/75 |
| 3,997,779 | 12/1976 | Rabl | 250/207 |
| 4,068,121 | 1/1978 | Bringhurst | 250/227 |
| 4,160,280 | 7/1979 | Atoji | 358/294 |
| 4,371,897 | 2/1983 | Kramer | 358/294 |

Primary Examiner—Michael A. Masinick
Attorney, Agent, or Firm—Millen & White

[57] ABSTRACT

In an electronic color separation system having a photomultiplier tube device in the scanning unit thereof, a diffuser plate is disposed between a light source and a photomultiplier tube in the immediate vicinity of said photomultiplier tube. The diffuser plate allows a uniform amount of light to impinge on the photomultiplier tube and prevents production of undersirable output signals.

5 Claims, 2 Drawing Figures

PHOTOMULTIPLIER TUBE DEVICE

BACKGROUND OF THE INVENTION

The present invention relates to a photomultiplier tube device used in an electronic color separating system.

As is known, electronic color separating is employed in color scanners, which are a type of photoelectric scan type recorders. To provide the barest outline of the general structure of such a color scanner, it comprises a scanning unit and a recording unit, wherein generally a color original is mounted in said scanning unit and a photographic material is mounted in said recording unit for recording separated photographs. In said scanning unit, a beam of scanning light is moved relative to the original to irradiate the latter in a manner such as to scan the whole surface of the original. That is, the original images are scanned as a great number of tiny picture elements; the scanning light beam is directed to the original and the transmitted light or reflected light is subjected to color separation (three colors, red, blue and green) through color filters, the intensity of the separated light rays being converted into the intensity of electric signals, for which purpose a photoelectric converter element or the like is used, whereby non-compensated color separation electric signals are obtained.

Next, these signals are transferred to an electronic circuit, where they are corrected to provide desired colors and tones. The corrected color signals are fed into the recording unit, where the intensity of the light from a separate exposure light source is controlled in response to the intensity of said signals. The separation photographic material mounted in the recording unit is progressively exposed to the light from said exposure light source, whereby a compensated color separation photograph is obtained.

There are various types of photoelectric converter elements used therein: photoelectric tubes, photomultiplier tubes, photoconductive elements, photoelectromotive elements, photodiodes, and phototransistors. For a slight or low level of light, however, photomultipliers are generally used.

The photomultiplier tube comprises a photocathode, a number of dynodes and an anode which are hermetically sealed in a vacuum container, the arrangement being such that when incident light falls upon the cathode surface, that portion emits photoelectrons, which are accelerated and impinge on the first dynode. When a single accelerated photoelectron impinges on the first dynode, a plurality of secondary electrons are emitted from the light receiving surface of the first dynode. Electrons are multiplied in the same manner in the second and third dynodes and finally collected by the anode.

The photoelectric receiving surface of the photomultiplier tube generally has a variation in sensitivity distribution, and, as a matter of fact, the percentage pass of mass-produced photomultiplier tubes is extremely low when they are to be used for color scanners requiring high accuracy. Accordingly, we have studied this problem and found, separate from the problem of variations in the sensitivity distribution of the photomultiplier tube, that the image of the filaments of a halogen lamp which is a light source for the color scanner is focused on the photoelectric receiving surface in pattern form and the distribution of light quantity of this image is not uniform.

Therefore, it has heretofore been necessary to conduct quality tests on photomultiplier tubes and to adjust tube mounting because of the required uniformity of the distribution of light from the light source and of the sensitivity distribution of the photomultiplier tube. As shown in FIG. 1, this adjustment is made using three setscrews and springs. In the testing arrangement generally schematically illustrated by FIG. 1, four photomultiplier tubes 2 (only one of which is shown) are arranged side by side on a body plate 1 within the body in the scanning unit of a color scanner for color separation of a light beam from an original, the intensity of the respective light rays being converted to the intensity of electric signals. The photomultiplier tubes 2 are turnably and vertically tiltably inserted into said body plate 1, and a phototube mounting auxiliary member 3 for receiving a number of lead wires projecting from the mouthpiece of each photomultiplier tube is assembled with a phototube mounting plate 4, and with the assembly being attached to the back of the body plate 1 with phototube springs 5 interposed therebetween. On the face of the body plate 1, a phototube case 6 is placed over each photomultiplier tube 2 and the flange 8 of the phototube case 6 is fixed to the body plate 1 by two attaching bolts 7 and threadedly attached to said assembled phototube mounting plate 4 by three phototube adjusting bolts 9, with said body plate 1 and phototube springs 5 being held therebetween.

With the arrangement thus made, a beam of light from a halogen lamp impinges on the photomultiplier tube 2 through an entrance window 10 formed in the phototube case 6, and where adjustment is necessary because of the non-uniformity of the sensitivity of the photoelectric receiving surface, this is made by turning the three phototube adjusting bolts 9 to adjust the distance between the phototube mounting plate 4 and the body plate 1. As a result, the multiplier tube 2 inserted in the phototube mounting auxiliary member 3 integrally assembled to the phototube mounting plate 4 is vertically tilted to look for a position which provides a satisfactory agreement between the photoelectric receiving surface and the distribution of the filament image from the halogen lamp, in an effort to prevent production of undesirable output signals. This adjustment has in the past been a very troublesome operation.

SUMMARY OF THE INVENTION

It is thus an object of the present invention to avoid such troublesome adjustment procedures.

The invention relates to an improvement in an electronic color separation system having a photomultiplier tube device in the scanning unit thereof for producing color separation signals in response to the received light from color separation means. The invention provides that the photomultiplier tube device comprises light diffuser plate means positioned in the immediate vicinity of the photomultiplier tube in the light path from a color separation means. This arrangement provides that a uniform amount of light impinges on the tube so that the output from the tube agrees with signals obtained by scanning an original and as a result, mounting adjustment is not necessary.

Upon further study of the specification and appended claims, further objects and advantages of this invention will become apparent to those skilled in the art.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DISCUSSION OF THE INVENTION

Figure 1:
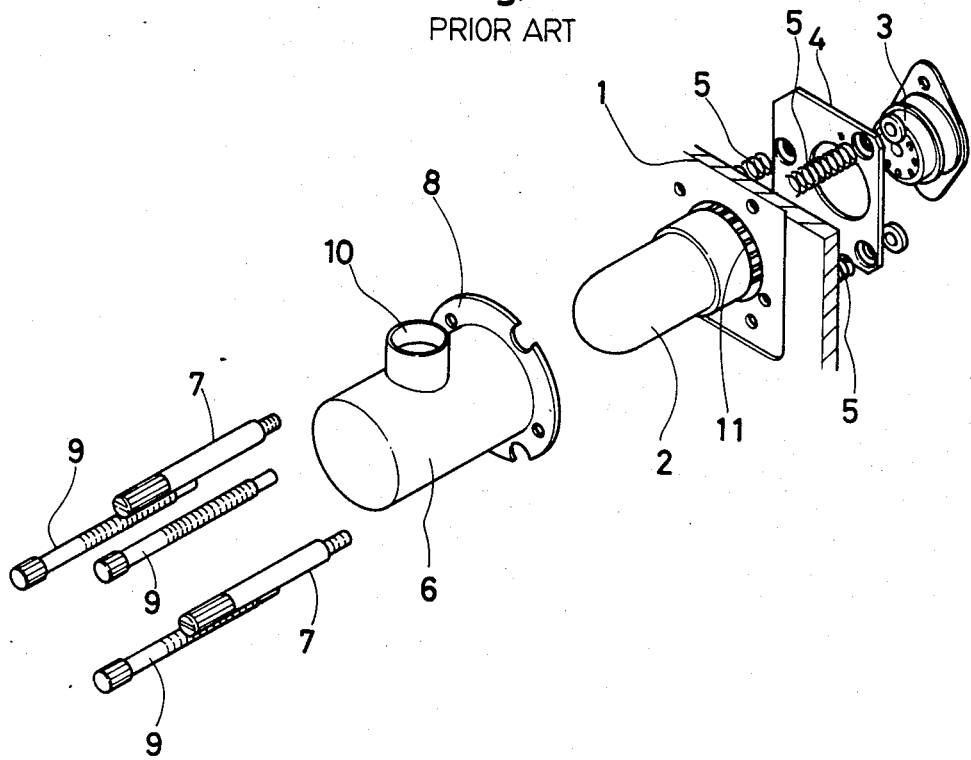
FIG. 1 schematically illustrates in exploded view a typical prior art photomultiplier tube adjustable mounting arrangement as previously discussed.
Figure 2:
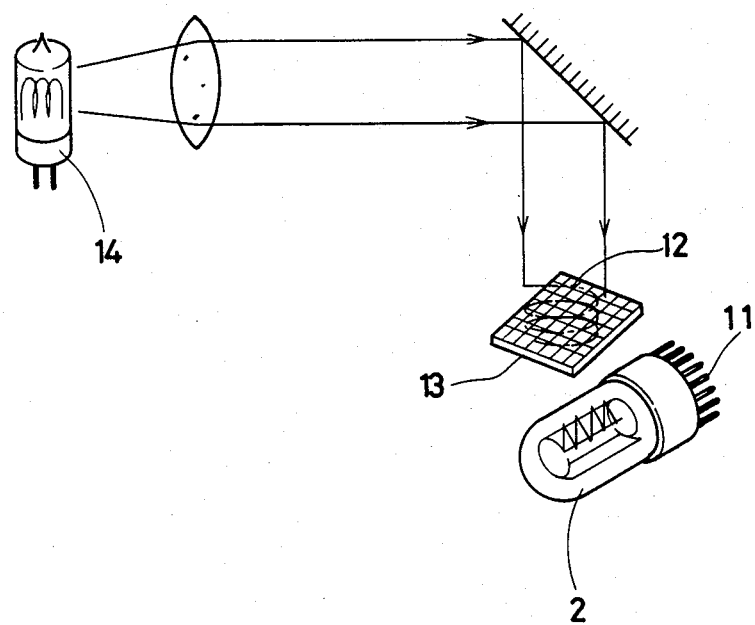
FIG. 2 schematically illustrates the improvement according to the invention showing the diffuser plate in the light path of the photomultiplier tube eliminating the requirement of having an adjustable complicated mounting.

The present invention has been devised to eliminate such conventional drawbacks and is shown in FIG. 2. A diffuser plate 13 is disposed immediately above the photomultiplier tube 2 to diffuse the image 12 of the filaments of a halogen lamp 14. For example, the image 12 of the filaments is focused on the diffuser plate 13, while diffused light is allowed to impinge on the photomultiplier tube 2. For the diffuser plate 13, use may be made of frosted glass, microprism plate, opal glass, etc., but a microprism is preferable in consideration of its ability to minimize optical loss.

In brief, the present invention has the following advantages.

(1) Since the diffuser plate allows a uniform amount of light to impinge on the photomultiplier tube, the output signals from the photomultiplier tube accurately agree with optical signals obtained by scanning an original, even if the irradiated position on the photomultiplier tube changes owing to mechanical vibrations caused by the scanning.

(2) Since there is no need to adjust the mounting of the photomultiplier tube, the time and labor for such adjustment can be saved. The mounting construction can be simplified.

We claim:

1. In an electronic color separation system having a photomultiplier tube device in the scanning unit thereof for producing electrical color separation signals in response to light received from color separation means, the improvement wherein said scanning unit comprises a halogen lamp as a light source, and said photomultiplier tube device comprises light diffuser plate means positioned and oriented in the light path from said halogen lamp in the vicinity of a photomultiplier tube for diffusing light from said halogen lamp to ensure that a uniform amount of diffused light impinges on the photomultiplier tube whereby the image of filaments from said halogen lamp is diffused eliminating the requirement of precise adjustment of the positioning of the photomultiplier tube.

2. A device as in claim 1 wherein said diffuser plate means is a diffuser plate.

3. A device as in claim 2 wherein said diffuser plate is made of frosted glass.

4. A device as in claim 2 wherein said diffuser plate is a microprism plate.

5. A device as in claim 2 wherein said diffuser plate is made of opal glass.

* * * * *